Patented Nov. 29, 1932

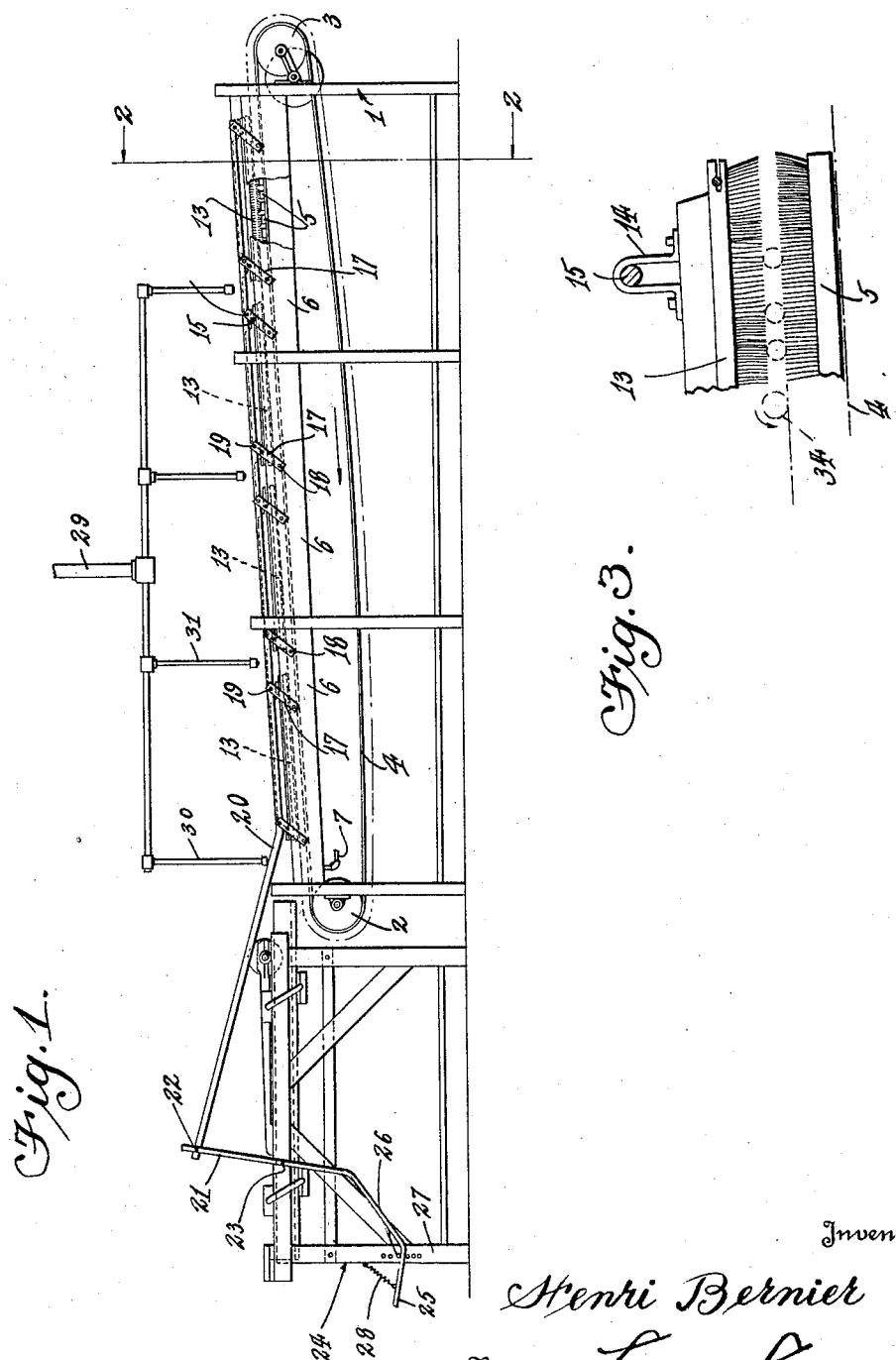

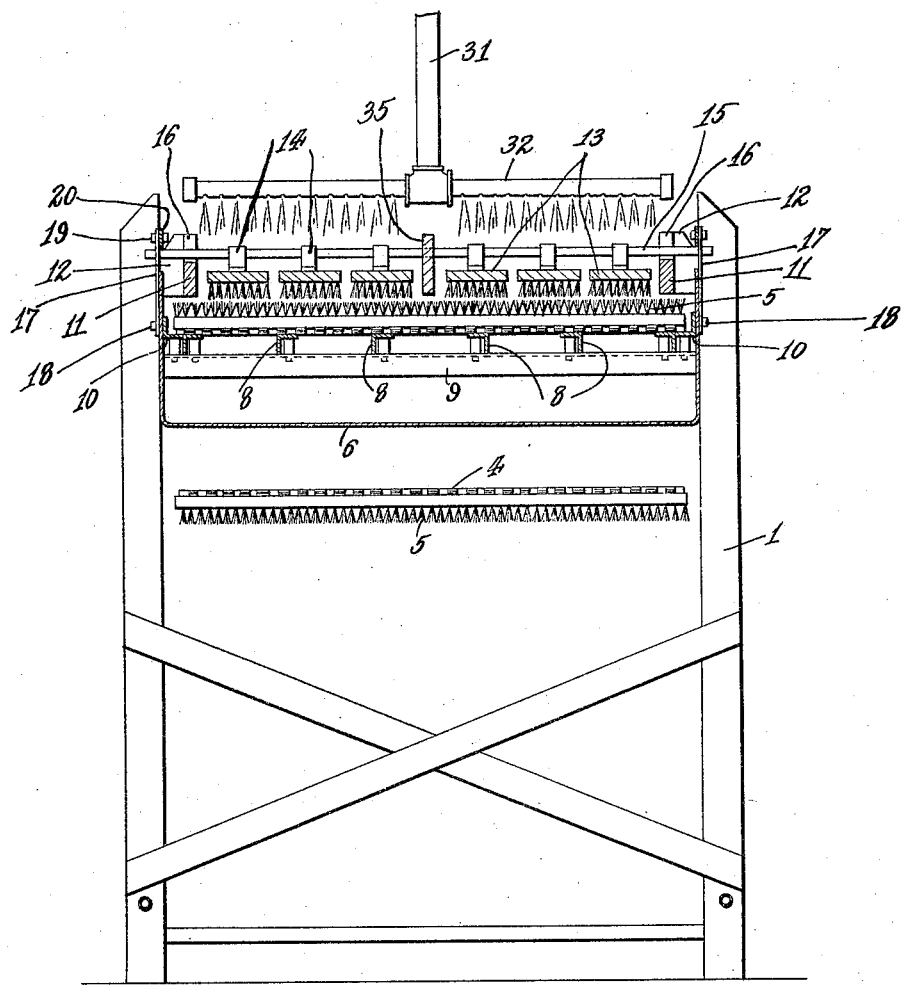

1,889,189

UNITED STATES PATENT OFFICE

HENRI BERNIER, OF OAKLAND, CALIFORNIA, ASSIGNOR TO CALIFORNIA PACKING CORPORATION, OF SAN FRANCISCO, CALIFORNIA, A CORPORATION OF NEW YORK

METHOD OF AND APPARATUS FOR SCRUBBING VEGETABLES

Application filed October 4, 1930. Serial No. 486,410.

This invention relates to a method of cleaning and scrubbing vegetables of a cylindrical form, such as for example asparagus, radishes, carrots and the like.

The invention also relates to an apparatus by means of which cylindrical vegetables may be thoroughly washed and scrubbed mechanically and automatically without injuring the vegetables even though they are of a rather delicate structure, such as for example asparagus.

Although the method of this invention and a particular embodiment of the apparatus, subsequently described in detail, is adapted to the washing and cleaning of various kinds of cylindrical vegetables, still the subsequent description will be limited to the application of the invention for the treatment of asparagus, inasmuch as difficulties are encountered with the treatment of asparagus which are not encountered when the more hardy vegetables are treated.

Vegetables such as asparagus are received by the packing houses with large quantities of dirt adhering thereto. This dirt is closely adherent and often necessitates the discarding of large quantities of asparagus as unfit for canning purposes. By referring to dirt, reference is made not only to earthy matter but also to surface stains. Such stains, of course, do not detract from the palatable quality of the vegetables but merely detract from appearance. Heretofore asparagus has been passed through washing tanks and blanching tanks and when dirty asparagus is handled, it is necessary to stop operations and drain and clean the blancher periodically. When very dirty asparagus is being received by the cannery, it is sometimes necessary to stop operations to clean out the blanchers when only thirteen baskets of asparagus have been passed therethrough.

This invention is primarily directed to a method of cleaning and scrubbing vegetables of a cylindrical form, such as asparagus, in a rapid and efficient manner. It is an object of this invention to disclose and provide a method of cleaning and scrubbing asparagus continuously and in large quantities without injuring the asparagus. Another object is to disclose and provide a method of cleaning asparagus while they are in motion.

Another object of this invention is to disclose and provide an apparatus for scrubbing vegetables of cylindrical form in a continuous and rapid manner.

Another object is to disclose and provide an apparatus for simultaneously conveying and scrubbing vegetables of cylindrical form.

Another object is to disclose and provide an apparatus for conveying and scrubbing asparagus of different sizes without injuring such asparagus.

A still further object is to disclose and provide an apparatus for conveying and scrubbing asparagus, the apparatus being adapted to accommodate asparagus of different sizes and to subject asparagus of different sizes to uniform scrubbing action.

Other objects, uses and advantages of this invention will become apparent to those skilled in the art from the following detailed description of the preferred mode of operation and of one form of device which may be used in carrying out the invention. It is to be understood that the specific form of apparatus described in detail hereinafter is merely illustrative of a variety of forms which may be constructed for the same purpose without departing from this invention.

In describing the invention, reference will be had to the appended drawings, in which Fig. 1 is a side elevation of one form of apparatus for scrubbing vegetables of cylindrical form.

Fig. 2 is an enlarged vertical section taken through the device along the plane indicated at 2—2 in Fig. 1.

Fig. 3 is a diagrammatical representation of a portion of the device in longitudinal section.

The method of this invention may be placed in operation by conveying cylindrical vegetables, such as asparagus, upon an upwardly inclined endless conveyor, the asparagus being preferably carried by said conveyor with their longitudinal axes substantially transverse to the conveyor, and subjecting the asparagus while on said conveyor, to the action of longitudinally immovable but vertically movable brushes.

Preferably in addition to the mechanical scrubbing, water or other suitable cleaning fluid is sprinkled on the vegetables during their travel on the conveyor. While the asparagus are thus being conveyed or moved bodily along the conveyor, they are also rotated by reason of their contact with the brushes. It will be obvious that the method can be carried out by a number of different devices.

The device shown in the drawings comprises a frame 1 having sprockets or rollers 2 and 3 mounted on shafts journaled at opposite ends of the frame 1 in suitable journals or bearings. Preferably one of said sprockets or rollers is at a higher elevation than the other. For example, the roller 3 is at a higher elevation than the roller 2. A suitable conveyor 4 in the form of an endless belt is carried on the rollers 2 and 3. Preferably the conveyor 4 is of a foraminous character and may consist of a mat chain such as is indicated in Fig. 2. Such mat chain may be provided with a brush surface. For example, brushes 5 of relatively narrow width may extends transversely across the conveyor 4 and be fastened thereto in any suitable manner.

Intermediate the sprockets or rollers 2 and 3 and beneath the upper flight of the endless conveyor 4, the frame 1 may carry tanks 6 adapted to catch the dirt and wash water.

A suitable outlet 7 may be provided at the lower end of the tanks 6 for the purpose of conveying the wash water to a point of disposal. Suitable guiding supports may be carried by the frame 1 beneath the upper flight of the endless conveyor 4 so as to maintain the upper flight of the conveyor in a predetermined inclined plane, such guiding supports in the form of angle irons 8 being indicated in Fig. 2 and are shown supported by transverse members 9 carried by the frame 1 or attached to the sides of the tanks 6. Angle irons 10 may also be positioned at the sides of the frame 1 for the purpose of supporting the edges of the upper flight of the conveyor 4 whereas the supports 8 extend longitudinally of the conveyor 4 and support portions intermediate the sides.

Guard rails 11 may extend longitudinally of the conveyor 4 and above the upper flight thereof so as to prevent the vegetables being scrubbed from becoming lodged in the space between the edges of the conveyor and the sides of the frame or tank 6. The guard rails 11 may be attached to the frame 1 in any suitable manner as by means of brackets 12.

Above the upper flight of the conveyor 4 scrubbing brushes 13 may be movably positioned. The scrubbing brushes 13 may take the form of longitudinally extending brush members provided with hangers in the form of loops 14 attached to the brushes.

The length of each of the brushes 13 is preferably less than the total length of the device so that the brushes 13 are actually spaced longitudinally along the conveyor and also spaced transversely of the conveyor. As shown in Fig. 1, there are four banks of upper brushes 13 spaced longitudinally of the conveyor intermediate its end. Each one of the banks, as shown in Fig. 2, consists of six brushes spaced transversely of the conveyor.

Rods 15 preferably extend through the hangers 14 and may loosely rest on cutout portions 16 formed in the guard rails 11. When the rods 15 rest in the cutout portions of the guard rails 11, then the brushes 13 loosely suspended from the rods 15 by means of the hanger straps 14 are in their lowermost position and in this position the brush members 13 should be closely adjacent to the brushes carried by the upper flight of the conveyor 4. The ends of the rods 15 are preferably journaled in links 17 between the ends thereof. The lower ends of the links 17 may be pivotally connected to the frame or to the tanks 6 as indicated at 18. The upper ends of the links 17 may be connected to means whereby the links 17 may be pivotally moved on the pivotal point 18.

For example, the upper ends of the links 17 may be pivotally connected as indicated at 19 to an arm 20, said arm 20 extending beyond the table 1 if desired, so as to form a handle by means of which all of the links 17 may be simultaneously actuated. As shown in Fig. 1, the member 20 may be pivotally connected to a lever 21 as indicated at 22, said lever 21 being pivotally connected at 23 to a feeding table or shaker table 24 and terminating in a foot pedal 25. By depressing the foot pedal 25, the member 20 may be caused to move, thus pivotally moving the links 17, thus causing the rods 15 to be raised, thereby lifting all of the brushes 13. Any suitable means for adjustably positioning the brushes 13 above the upper flight of the conveyor 4 may be employed.

As shown in Fig. 1, the lever 21 may come into abutting relation with a movable stop 26 which may be positioned in any one of a plurality of apertures in the leg 27 of the feeding table 24. Furthermore, a tension spring 28 may be provided for the purpose of providing a means for maintaining the brush suspension in a predetermined position.

It is to be understood that the shaker table or feeding table 24 may be of any desired construction adapted to receive asparagus and distribute the same in a substantially uniform layer and to discharge such layer onto the conveyor belt 4 of the scrubbing machine. Preferably the shaker table 24 is of such character and construction as to distribute the asparagus with the longitudinal axes thereof substantially transversely to the longitudinal axis of the conveyor.

Above the brushes 13 and preferably between longitudinal banks of brushes, means may be provided for supplying a washing fluid to the vegetables and to the upper flight of the conveyor 4. Such means for example, may include a supply conduit 29 provided with branch lines 30, 31, and the like, terminating in transverse spray heads 32. Any desired number of spray heads 32 positioned above the upper flight of the belt 4 may be employed, provided the washing fluid may be thus applied to the vegetables on the upper flight of the conveyor 4.

The brushes 5 and 13 are preferably well made so that the fibres of said brushes are not loosened when the apparatus is in operation. It has been found that white tampico fibre is very satisfactory as it is sufficiently rigid to thoroughly scrub the vegetables and at the same time is not sufficiently rigid to injure the stalks of asparagus. It is to be understood that other forms of fibre, such as cocoanut, palmetto and the like, may also be used for the brushes.

As has been stated hereinabove, the apparatus may be employed in any desired position in the flow stream of a cannery. It has been found that when the scrubbing apparatus of this invention is employed in advance of the hot section of the blancher, the first washing in the blancher can be dispensed with.

If in the same system another such scrubbing device is placed back of the hot section of the blancher, it will do away with the third section of the blancher as the scrubbing of the asparagus while it is hot improves it greatly in appearance and reduces the proportion of asparagus which has to be discarded.

In operation it will thus be seen that the asparagus is discharged onto the conveyor 4 and as said conveyor is upwardly inclined, there is an immediate tendency for the asparagus to align itself on the belt with the axis of the stalks substantially transversely to the longitudinal axis of the conveyor. The upwardly moving conveyor carries the vegetables with it although there may be some minor tendency for certain of the stalks to roll backwards downwardly down the conveyor. The stalks are then brought in contact with the suspended brushes 13.

Inasmuch as the brushes 13 are vertically movable by reason of the loop hangers 14, the asparagus itself will cause the brushes 13 to move upwardly. The asparagus is thus held in contact with the conveyor 4 by reason of the weight of the brushes 13. The movement of the conveyor 4 causes the stalks of asparagus to rotate so that the scrubbing effect is primarily caused by the longitudinal immovable upper brushes 13. This is diagrammatically illustrated in Fig. 3 wherein it is seen that the conveyor 4 causes the stalk of asparagus 34 to rotate in the direction of the arrow, whereas the upper brush 13 which is longitudinally immovable, scrubs the asparagus, said asparagus being subjected during said scrubbing merely to a pressure caused by the weight of the brush 13, inasmuch as the brush 13 is vertically movable in the hanger 14 through which the rod 15 extends. Furthermore, it is observed that the device is capable of treating and effectively cleaning vegetables of differing sizes as the machine accommodates itself to stalks of varying diameter without exerting a greater scrubbing pressure on the larger stalks than it does on the smaller stalks.

In actual practice it has been found that the linear speed of the belt 4 may be as high as 225 feet per minute and still effectively clean and scrub asparagus without breaking their heads. Normally however, an operating speed of 150 to 175 feet per minute gives good results.

Furthermore, although as has been stated hereinabove, the machine is adapted to accommodate a heterogeneous supply of vegetables, it will, of course, be even more effective if the vegetables are first sized or graded to size and such graded vegetables then fed to the scrubbing machine.

Although it has been stated hereinabove that the conveyor 4 is preferably a mat chain or wire draper, it is to be understood that a similar conveyor for the purposes of this invention may be constructed by using two or more continuous chains to which the brushes 5 are directly connected.

Furthermore it is to be understood that although means for driving the conveyor 4 are not distinctly shown in the drawings, any form of drive may be employed and preferably a variable speed transmission is inserted in the drive so as to permit changes to be made in the linear speed of the conveyor rapidly.

It is to be evident that the apparatus of this invention is readily and cheaply constructed. Furthermore, it is easily kept clean and the brushes, if properly made and of a fibre which does not pull out or break off, last for a very long period of time. The machine is very easily cleaned and kept sweet. When wide machines are employed, it is desirable to partition them longitudinally down the center. As shown in the drawings, 35 indicates a partition of this character.

Those skilled in the art will readily appreciate the advantages of this invention and the various forms which it may assume. The invention is not limited to the specific sequence of steps or arrangement of elements described in detail hereinabove but instead embraces all such changes and modifications as come within the scope of the appended claims.

I claim:

1. A method of treating asparagus comprising moving asparagus with their axes substantially transverse to the direction of movement, rotating the asparagus during such movement, and subjecting the asparagus to a scrubbing pressure during such movement and rotation.

2. A method of treating asparagus comprising moving asparagus with their axes substantially transverse to the direction of movement, and alternately spraying and scrubbing the asparagus during movement thereof.

3. A method of treating asparagus comprising moving asparagus with their axes substantially transverse to the direction of movement, rotating the asparagus during such movement, and alternately spraying and scrubbing the asparagus during such movement and rotation thereof.

4. In an apparatus for washing asparagus, the combination of an endless foraminous conveyor provided with a brush surface, vertically movable brushes suspended above said conveyor, and spraying means positioned above said conveyor.

5. In an apparatus for washing asparagus, the combination of an endless foraminous conveyor provided with a brush surface, vertically movable brushes suspended above said conveyor, spraying means positioned above said conveyor, and tanks positioned beneath the upper reach of said conveyor.

6. In an apparatus for washing vegetables, the combination of a frame, an upwardly inclined foraminous conveyor provided with a brush-like surface carried by said frame, means for driving said conveyor, vertically movable brushes pivotally suspended above said conveyor, means for spraying vegetables on said conveyor, and means for adjustably positioning said brushes above said conveyor in minimum spaced relation thereto.

7. In an apparatus for washing vegetables, the combination of a frame, upwardly inclined table guides carried by said frame, an endless foraminous conveyor provided with a brush-like surface mounted on said frame, the upper reach of said conveyor being adapted to be supported by said table guides, a plurality of vertically movable brushes suspended above said conveyor, means for spraying vegetables on said conveyor, and means for adjustably positioning said brushes above said conveyor in minimum spaced relation thereto.

8. In an apparatus for washing vegetables, the combination of a frame, upwardly inclined table supports carried by said frame, an endless foraminous conveyor provided with a brush-like surface mounted on said frame, the upper reach of said conveyor being adapted to be guidingly supported by said supports, brushes extending longitudinally of said conveyor and longitudinally spaced thereon suspended above said conveyor, said brushes being vertically movable by action of vegetables on said conveyor, means for spraying vegetables on said conveyor, a container for fluids positioned beneath said table guides and carried by said frame, and means for adjustably positioning said brushes above said conveyor in minimum spaced relation thereto.

Signed at Los Angeles, Calif., this 27th day of September, 1930.

HENRI BERNIER.